US 6,742,052 B2
May 25, 2004

(12) United States Patent
Himmel et al.

(10) Patent No.: US 6,742,052 B2
(45) Date of Patent: May 25, 2004

(54) WIRELESS SYSTEM BUS

(75) Inventors: Maria Azua Himmel, Yorktown Heights, NY (US); Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 09/925,255

(22) Filed: Aug. 9, 2001

(65) Prior Publication Data

US 2003/0033452 A1 Feb. 13, 2003

(51) Int. Cl.[7] .................................................. G06F 3/00
(52) U.S. Cl. .............................. 710/2; 710/9; 710/107; 710/109; 710/300; 710/305
(58) Field of Search ................................ 710/2, 9, 300, 710/305, 107, 109

(56) References Cited

U.S. PATENT DOCUMENTS

| | | | | |
|---|---|---|---|---|
| 5,864,708 A | * | 1/1999 | Croft et al. | 395/821 |
| 5,877,745 A | * | 3/1999 | Beeteson et al. | 345/156 |
| 5,890,015 A | * | 3/1999 | Garney et al. | 395/882 |
| 6,018,775 A | * | 1/2000 | Vossler | 710/1 |
| 6,272,190 B1 | * | 8/2001 | Campana, Jr. | 375/347 |
| 2001/0003191 A1 | * | 6/2001 | Kovacs et al. | 709/226 |
| 2001/0019956 A1 | * | 9/2001 | Tada | 45/434 |

OTHER PUBLICATIONS

Robert Stuart, Implementing an IrDA Control Peripheral, Sharp. Feb. 1999.*

* cited by examiner

*Primary Examiner*—Jeffrey Gaffin
*Assistant Examiner*—Alan Chen
(74) *Attorney, Agent, or Firm*—Cynthia S. Byrd; Streets & Steele; Jeffrey L. Streets

(57) ABSTRACT

A mobile or desktop computer having a system bus that is exposed externally using a wireless transceiver so that input and output devices within proximity of the computer can be configured for immediate use. The wireless system bus of the invention provides discovery and acceptance of wireless peripheral devices within the range of the wireless transmissions. Serial or parallel communication can be supported on the same or different frequency channels. Preferably, the invention utilizes a dedicated discovery frequency for detecting the presence of peripherals in the proximity. Commands and data can be exchanged between the computer and the peripheral device in a secured manner.

51 Claims, 12 Drawing Sheets

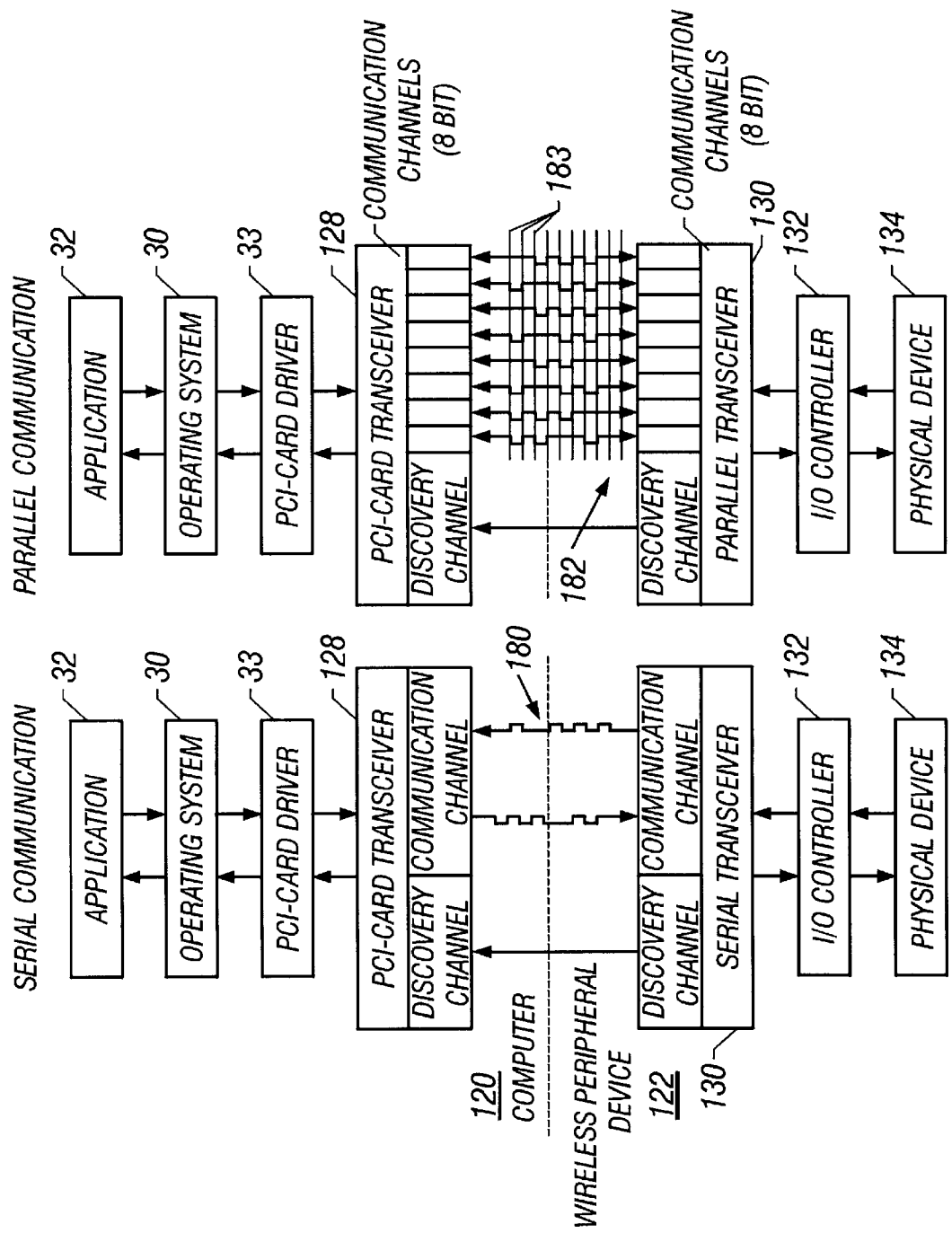

WIRELESS SYSTEM BUS

BACKGROUND OF THE INVENTION

1. Field of the Invention

The present invention relates to a system bus and method for using the system bus. More particularly, the invention relates to a system bus and method that provides wireless communication with various input and output devices.

2. Description of the Related Art

Unlike their desktop counterparts, handheld computers have limited capabilities because of limitations on size and power availability. The small size means that the display must be small, the interior space for hardware is cramped, connections for peripherals are minimal, expanding or upgrading the system is cumbersome, and the space and weight allowed for batteries or other power sources is quite small. While handheld computers are generally provided with power adapters for home or office use, it is generally necessary for the batteries to last several hours without a charge in order for the handheld to deliver the full benefits of portability that users expect from a handheld computer.

Furthermore, cabling to external input and output devices present usability and portability problems. Expansion cards are now available for adding various functions to the handheld, such as additional memory, backups, modems, games and the like. However, only one or two cards can be used at one time and any additional cards must be carried separately. If peripheral devices are going to be used with the computer, it is necessary to keep and use cables that add bulk, weight and spacing limitations to the system. Furthermore, the cables themselves are subject to damage and can prevent successful use of the peripherals to which the cables are connected.

The use of peripherals also increases the amount of power that must be available to the computer. Consequently, the computer must have a much bigger battery than would otherwise be required to merely operate the computer.

Another problem with connecting peripheral devices to a computer through cables is that increasing the number of peripheral connections increases the bulk and cost of the system. For example, a Universal Serial Bus ("USB"), supporting data transfer rates of 12 Mbps (12 million bits per second), can be used to connect up to 127 peripheral devices, such as mice, modems, and keyboards. However, peripheral devices must be connected through a hub, such as a 4 or 6 port hub. If the number of peripheral devices later exceeds the number of ports, then the hub must either be replaced with a hub having more ports or a second hub must be daisychained with the first hub, further exacerbating the cabling problem.

It is also common that older handheld computers will not support new input and output devices due to architectural limitations. While most personal computers have been designed with backward compatibility as an important consideration, handheld computers do not always provide this compatibility. Consequently, it may be necessary to replace the handheld with a newer model in order to support the use of recently developed input and output devices.

One attempt to address these problems is the use of docking stations, such as that described in U.S. Pat. No. 6,088,752 entitled METHOD AND APPARATUS FOR EXCHANGING INFORMATION BETWEEN BUSES IN A PORTABLE COMPUTER AND DOCKING STATION THROUGH A BRIDGE EMPLOYING A SERIAL LINK. A docking station is a platform into which a portable computer can be installed. The docking station typically contains slots for expansion cards, bays for storage devices, and connectors for peripheral devices, such as printers and monitors. Once inserted in a docking station, the portable computer essentially becomes a desktop model computer. When it is taken out, it becomes a portable computer again. More importantly, some data is accessible in both modes because it resides on the portable computer's drives. The idea behind docking stations is to combine the expansion possibilities of desktop model computers with the portability of notebook computers. In addition, the docking station enables use of a full-size keyboard or a monitor, and provides access to other peripherals or resources.

However, docking stations and personal computers have their own limitations. For example, docking stations must be made specifically for a given portable computer, because there is no standard for docking stations. Also, both docking stations and personal computers require nests of cables and wires in order to achieve the level of connectivity of which they are capable. And while these systems have more expansion capabilities than handheld or portable computers, it is still necessary to purchase expansion cards and cables, and then configure them to communicate with the system. Also, portability is inhibited because of cabling portability challenges and power limitations.

Therefore, despite the foregoing developments, there remains a need for a computer that has greater capacity for supporting multiple input and output devices. There is also a need for a computer that would provide greater compatibility so that the computer can support old and new input and output devices. It would be desirable if this improved support of input and output devices could be accomplished using a standard communication protocol that would allow the computer to communicate with various input and output devices or peripherals regardless of brand, physical connector type, or power consumption. It would also be desirable if two or more computers could directly share one or more peripheral devices without the need for expensive hardware.

SUMMARY OF THE INVENTION

The present invention provides a method comprising: (a) establishing a wireless communication link between a computer through a first transceiver communicatively coupled to a bus in the computer, and a second transceiver communicatively coupled to a peripheral device through a control unit, wherein the computer is configured to operate under the control of an operating system and one or more application programs; (b) providing identification of the peripheral device to a driver via the first transceiver, wherein the driver is stored in a memory device that is coupled to the bus; and (c) communicating commands between the one or more application programs and the peripheral device through the operating system, the driver, the first transceiver, the second transceiver, and the control unit. In one embodiment, the method includes transmitting a device discovery signal from the second transceiver at a device discovery frequency, receiving the device discovery signal at the first transceiver, and communicating the device discovery from the first transceiver over the bus to the driver. The method will preferably include communicating a request for identification from the driver to the control unit of the peripheral device. In accordance with user preferences, the method may further comprise automatically configuring the driver for communication with the identified peripheral device. Alternatively, the method may include informing a user of the computer that the peripheral device has been identified, and querying the user whether to accept and configure the peripheral device.

The wireless communication link between the computer system bus and a peripheral device may incorporate security measures including, but not limited to, encryption, passwords, and frequency hopping. The discovery and configuration of the wireless peripheral is accomplished using a secure access protocol. A preferred security protocol can be an encoded communications data stream using a cryptographic algorithm.

Further, the method may comprise: (a) establishing a wireless communication link between a wireless bus extender in a computer and a transceiver communicatively coupled to a peripheral device through a control unit; (b) providing identification of the peripheral device to a driver via the first transceiver, wherein the driver is stored in a memory device that is coupled to the bus; and (c) communicating commands between the one or more application programs and the peripheral device through the operating system, the driver, the first transceiver, the second transceiver, and the control unit. It is preferred that the wireless bus extender comprise a transceiver for transmitting and receiving wireless signals selected from radio frequency, infrared, or combinations thereof.

In accordance with the wireless system bus and wireless bus extender of the present invention, it is possible to communicate wirelessly using either serial or parallel communications. Wireless serial communications or signals are transmitted at a single frequency and provide digital information at a given clock speed. Such transmission may be thought of as a sort of square wave signal, including both return-to-zero and non-return-to-zero signals. In order for such information to be useful to a computer or peripheral device, the signals must generally be deserialized. On the other hand, parallel communications or signals are transmitted using a separate frequency for each of the parallel channels required. For example, eight bit parallel communications would require that each of the eight bits be transmitted at the same time or clock pulse over eight different frequencies.

Another aspect of the invention provides a computer system comprising: (a) a system bus providing communication lines between a memory device, a central processing unit, an input/output controller, and a user input device; (b) a wireless system bus extender coupled to the system bus; and (c) bus extender driver code stored in the memory and executing on the central processing unit to establish wireless communication with a wireless peripheral device. Preferably, the wireless system bus extender and the bus extender driver code cooperate to either (1) discover the wireless peripheral device, (2) request and receive identification of the wireless peripheral device, (3) communicate a bus address to the wireless peripheral device, or (4) a combination thereof. The computer system may also provide an operating system stored in the memory and executing on the central processing unit to execute commands from one or more application programs stored in the memory and executing on the central processing unit, wherein the bus extender driver code makes wireless peripheral devices accessible to the operating system. The wireless communication system may be selected from serial and parallel communications using wireless signals.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 8 is a flow diagram illustrating the flow of data between a handheld computer and a wireless peripheral device over both a serial communication channel and a parallel communication channel.

DETAILED DESCRIPTION

The present invention provides a computer having a system bus that is exposed externally using a wireless transceiver so that input and output devices within proximity of the computer can be configured for immediate use by the device. The wireless system bus of the invention provides discovery and acceptance of wireless peripheral devices within the range of the wireless transmissions. It should be recognized that the wireless system bus may be incorporated into any type of computer, specifically including, without limitation, desktop personal computers and portable computers, such as laptop computers, notebook computers, handheld computers, and personal digital assistants. While much of the following description is directed to handheld computers, the invention lends itself equally to other computer architectures.

As used herein, "handheld personal computer" (H/PC) means a small general computing device having a processing unit that is capable of running one or more application programs, a display, and an input mechanism that is typically something other than a full-size keyboard. The input mechanism might be a keypad, a touch-sensitive screen, a track ball, a touch-sensitive pad, a miniaturized QWERTY keyboard, or the like. The term "wireless", as used herein, shall be taken to include any communication means without wires, such as radio frequency transmissions and infrared transmissions.

The term "system bus", as used herein, shall be taken to include the internal bus and any expansion bus, such as an ISA or PCI bus, coupled to the internal bus through a bridge. While a wireless expansion bus is within the scope of the present invention, the preferred wireless system bus is a wireless internal bus providing either serial or parallel communications. Where a wireless expansion bus is being used, the bus may be a PCI bus or other parallel communications bus, or a USB or other serial communications bus.

Because the connection between computers and peripheral devices of the present invention are wireless, it is possible to share peripheral devices among a plurality of computers. Furthermore, this sharing may be accomplished without additional cables and without expensive hardware such as a multipath I/O device. The sharing of peripheral devices is accomplished simply by providing contention management within the software of the peripheral device. Contention management gives control over the peripheral device to one computer at a time. Any contention management scheme currently being used with multipath I/O devices may be implemented in software or hardware for use in accordance with the present invention.

Figure 1:
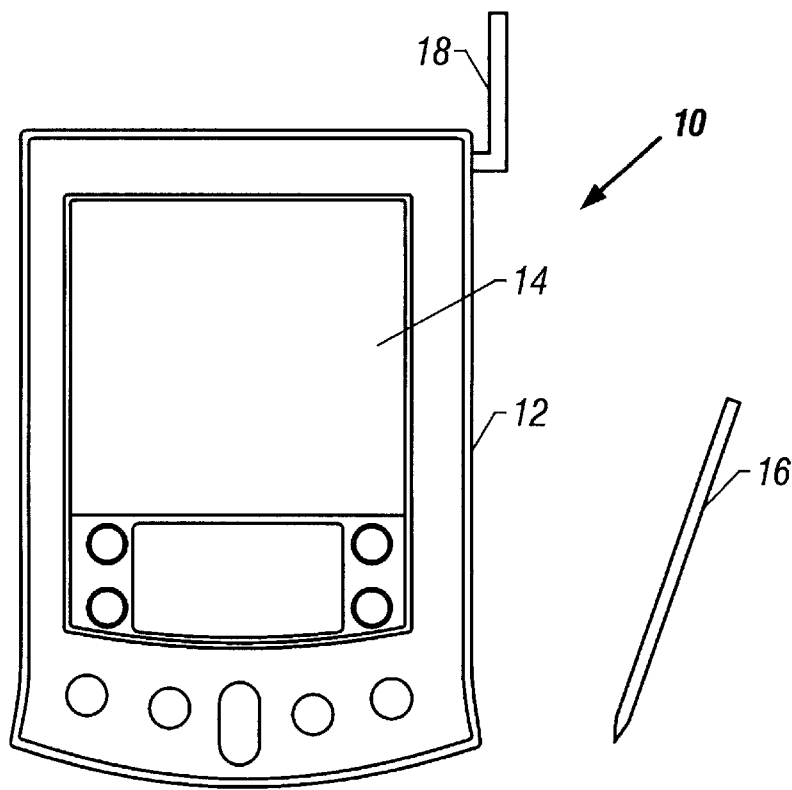
FIG. 1 is an example of a computer suitable for use in accordance with the present invention.

FIG. 1 is an illustration of a handheld personal computer, specifically a personal digital assistant (PDA) 10, such as the IBM WorkPad® from International Business Machines Corporation. However, the invention is compatible with other brands and types of handheld personal computers, such as a personal organizer, a palmtop computer, a computerized notepad, or the like.

Handheld computing device 10 has a casing 12 and an LCD (liquid crystal display) 14 with a touch-sensitive screen mounted in the casing 12. A stylus 16 may be used with the device to enter data through the touchscreen display 14. The handheld computing device 10 can also be implemented with a wireless transceiver (internal) such as an IR (infrared) transceiver and/or an RF (radio frequency) transceiver coupled to antenna 18.

Figure 2:
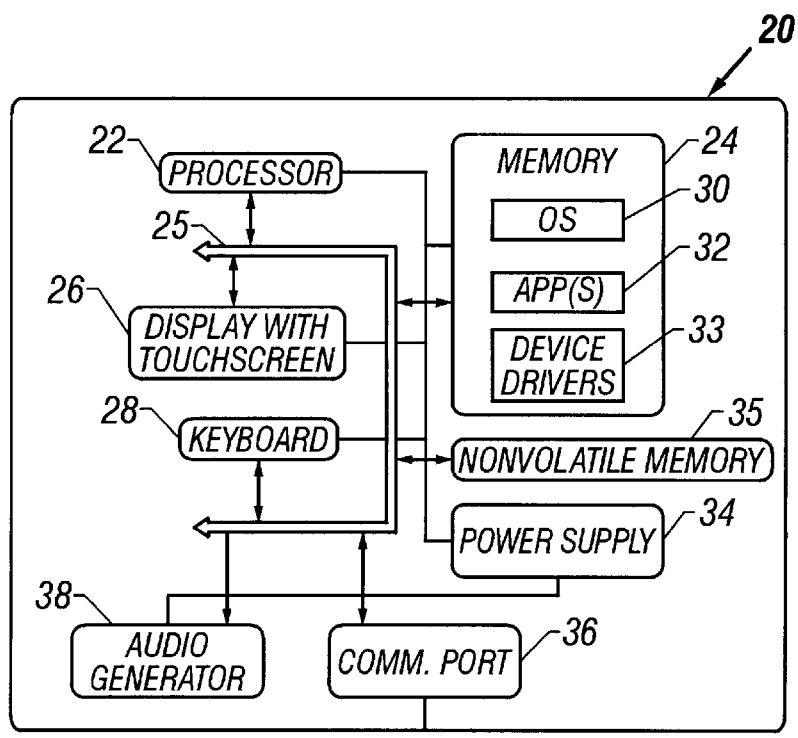
FIG. 2 is a schematic diagram of exemplary system architecture for a computer system, such as the computer of FIG. 1.

FIG. 2 is a block diagram showing the functional components of the handheld computing device 20. It has a processor 22, a memory 24, a display 26, an optional keyboard 28, and a communications port 36 in communication with an internal system bus 25. The memory generally includes both volatile memory 24 (e.g., RAM) and non-volatile memory 35 (e.g., ROM, PCMCIA cards, and harddisk drives). An operating system 30 is resident in the memory 24 and executes on the processor 22. The H/PC 20 preferably runs the Palm® OS operating system from Palm Computing. However, the handheld computing device may be implemented with other operating systems, such as Windows® CE or Linux.

One or more application programs 32 are loaded into memory 24 and run on the operating system 30. Examples of applications include email programs, scheduling programs, PIM (personal information management) programs, word processing programs, spreadsheet programs, Internet browser programs, and so forth. Device drivers 33 are also provided in memory for controlling operation of the display 26, keyboard 28, and audio generator 38.

The H/PC 20 has a power supply 34, which is implemented as one or more batteries or fuel cells. The power supply 34 might further include an external power source that overrides or recharges the built-in batteries, such as an AC adapter or a powered docking cradle.

Figure 3:
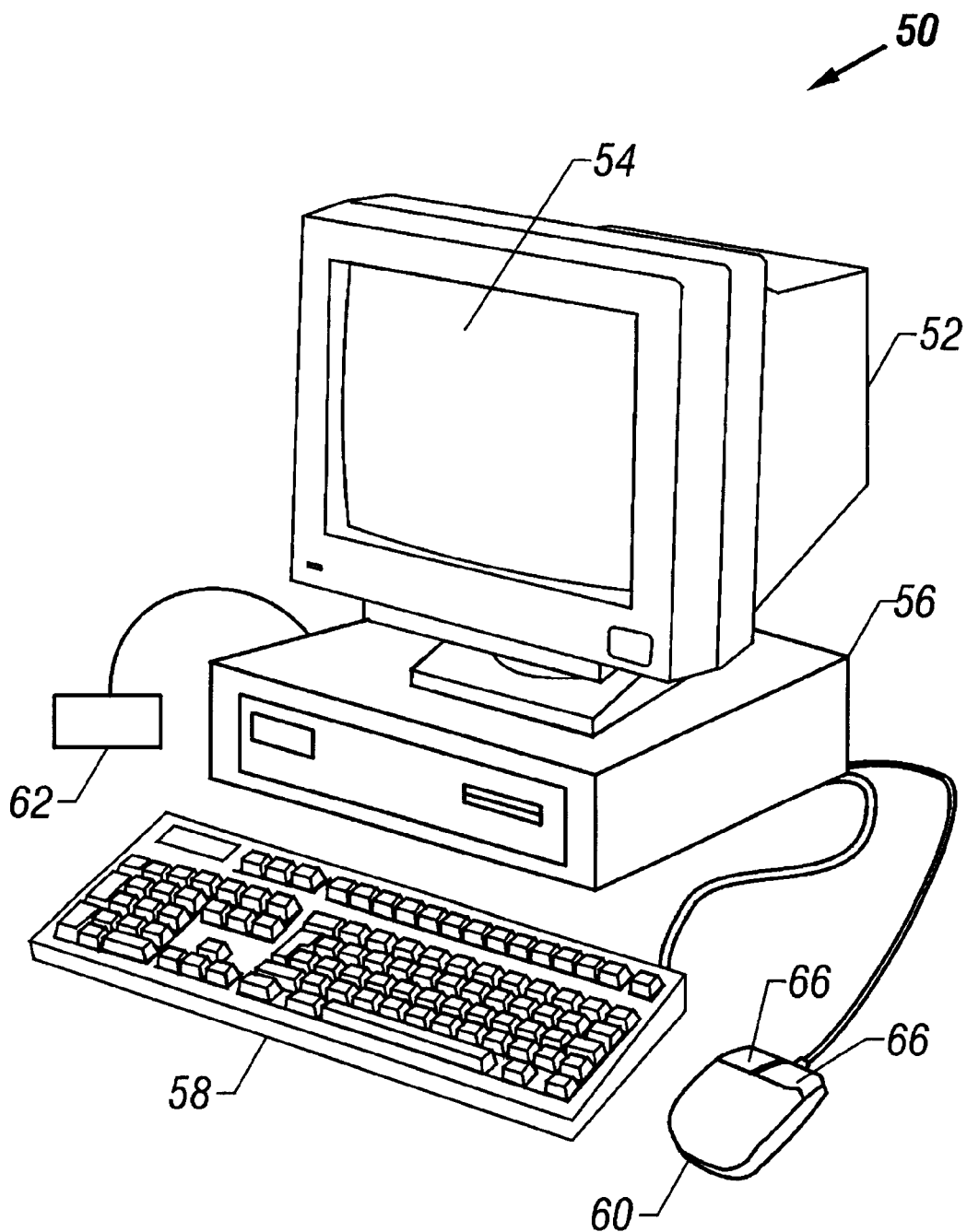
FIG. 3 is an example of a personal computer system suitable for use in accordance with the present invention.

FIG. 3 shows a prior art personal computer system 50. The personal computer 50, such as an IBM NetVista®, includes a display device 52 (such as a monitor), a display screen 54, a cabinet 56 (which encloses components typically found in a computer, such as CPU, RAM, ROM, video card, hard drive, sound card, serial ports, etc.), a keyboard 58, a mouse 60 and a modem, router or network card 62. Mouse 60 may have one or more buttons or control devices, such as buttons 66. The computer preferably has a browser and some type of communication device such as modem 62 that allows computer system 50 to be connected to the Internet.

Figure 4:
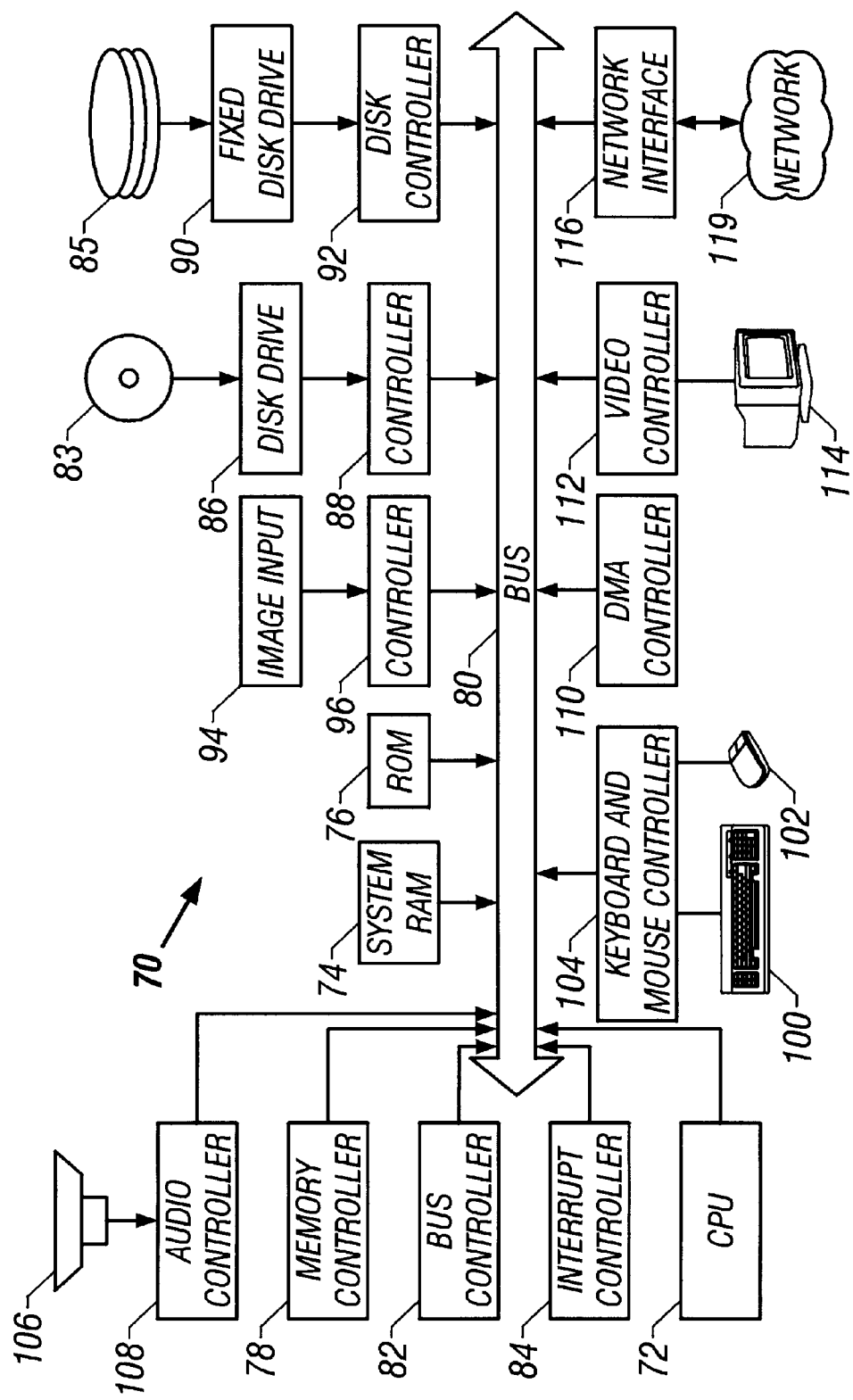
FIG. 4 is a schematic diagram of exemplary system architecture for a computer system, such as the personal computer system of FIG. 3.

FIG. 4 illustrates an exemplary system architecture for a prior art computer system 70, such as the personal computer system 50 of FIG. 3. The exemplary computer system of FIG. 4 is for descriptive purposes only. Although the description may refer to terms commonly used in describing particular computer systems, the description and concepts equally apply to other systems, including systems having dissimilar architectures.

Computer system 70 includes a central processing unit (CPU) 72, which may be implemented with a conventional microprocessor, a random access memory (RAM) 74 for temporary storage of information, and a read only memory (ROM) 76 for permanent storage of information. A memory controller 78 is provided for controlling RAM 74 and ROM 76.

A bus 80 interconnects the components of computer system 70. A bus controller 82 is provided for controlling bus 80. An interrupt controller 84 is used for receiving and processing various interrupt signals from the system components.

Mass storage of data may be provided by a flash memory diskette, CD ROM 83, or hard drive 85. Data and software maybe exchanged with computer system 70 via removable media, such as flash memory, a diskette, or CD ROM 83. Removable media is insertable into drive 86 that is, in turn, connected to bus 80 by a controller 88. Hard disk 85 is part of a fixed disk drive 90 that is connected to bus 80 by controller 92. An optional image input device 94, such as a digital camera or scanner, is also shown coupled to the bus 80 through the controller 96.

User input to computer system 70 may be provided by a number of devices. For example, a keyboard 100 and mouse 102 are connected to bus 80 by controller 104. An optional audio transducer 106, which may act as both a microphone and a speaker, is connected to bus 80 by audio controller 108, as illustrated. It will be obvious to those skilled in the art that other input devices, such as a pen and/or tablet maybe connected to bus 80 using an appropriate controller and software, as required. Direct memory access (DMA) controller 110 is provided for performing direct memory access to RAM 74. A visual display is generated by video controller 112 that controls video display 114. Computer system 70 also includes a communications adaptor 116 that allows the system to be interconnected to a local area network (LAN) or a wide area network (WAN), schematically illustrated as network 119.

Operation of computer system 70 is generally controlled and coordinated by operating system software, such as the AIX® operating system, available from International Business Machines Corporation, Austin, Tex., or Windows 2000® from Microsoft Corp., Redmond, Wash. The operating system controls allocation of system resources and performs tasks such as processing scheduling, memory management, networking, and I/O services, among other things. In particular, an operating system resident in system memory and running on CPU 72 coordinates the operation of the other elements of computer system 70. The present invention maybe implemented with any number of commercially available operating systems, including Palm OS, Linux, Windows NT and DOS. One or more applications, such as Lotus Notes, commercially available from Lotus Development Corp., Cambridge, Mass., maybe executable under the direction of the operating system. If the operating system is a true multitasking operating system, such as Linux, multiple applications may execute simultaneously.

Figure 5:
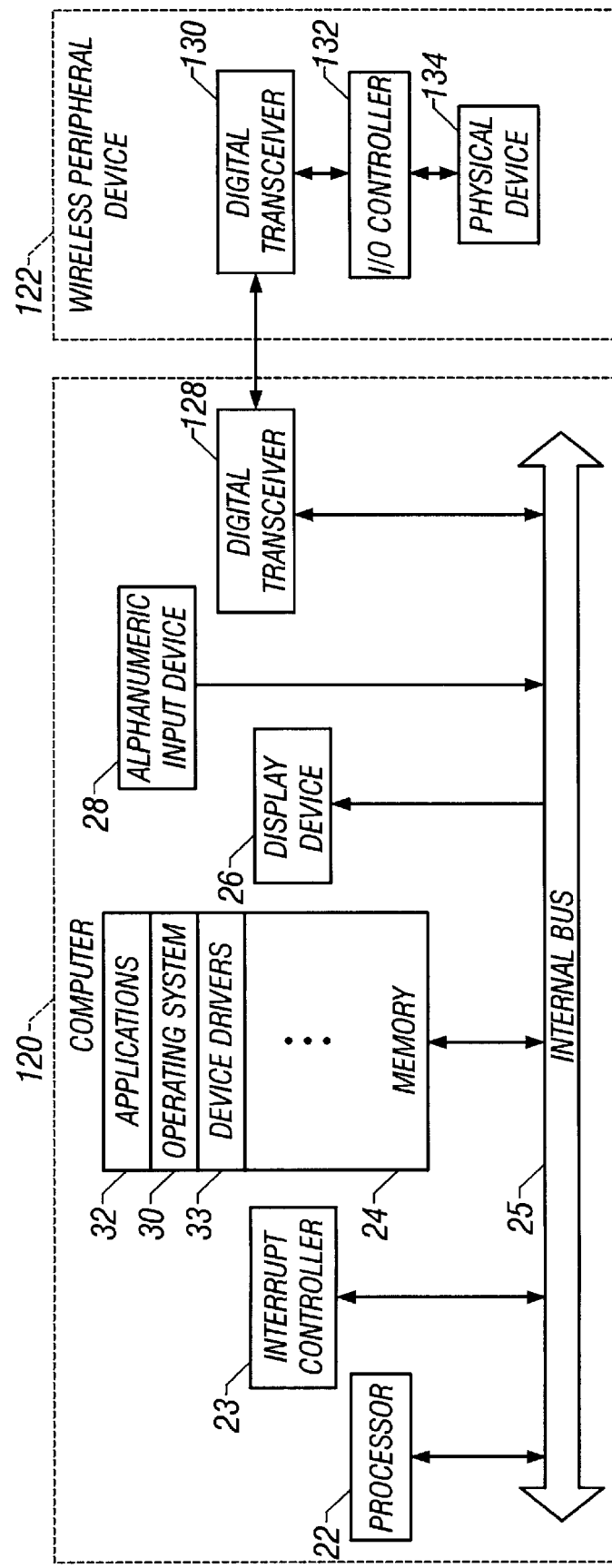
FIG. 5 is a schematic diagram of a first embodiment of a wireless system bus communicating with a wireless peripheral device.

FIG. 5 is a schematic diagram of a first embodiment of a computer 120 having a wireless internal system bus for communicating with a wireless peripheral device 122. Similar to either the handheld computer of FIG. 2 or the personal computer of FIG. 4, the computing device 120 has a processor 22, an interrupt controller 23, an internal or external memory 24, a display device 26, and an alphanumeric input device 28, such as an optional keyboard. An operating system 30, one or more applications 32, and one or more device drivers 33 are resident in the memory 24 and execute on the processor 22. The components of the computer 120 communicate over the internal bus 25. Finally, a digital transceiver 128 is coupled directly to the internal bus 25 to form a wireless internal bus in accordance with the invention. While the computer 120 is illustrate with a hardwired display device 26 and alphanumeric input device 28, as would be the case in a typical handheld computer, it should be recognized that even these devices may communicate wirelessly with the system bus in accordance with the invention.

The wireless peripheral device 122 maybe any present or future input or output device, but may specifically include, without limitation, a memory or storage device, disk drive, printer, keyboard, display, or speakers. The device 122 includes a digital transceiver 130, an input/output controller 132, and a physical device 134 that performs the actual input or output. The input/output controller 132 is responsible for managing and interpreting the communications between the digital transceiver and the physical device.

Figure 6:
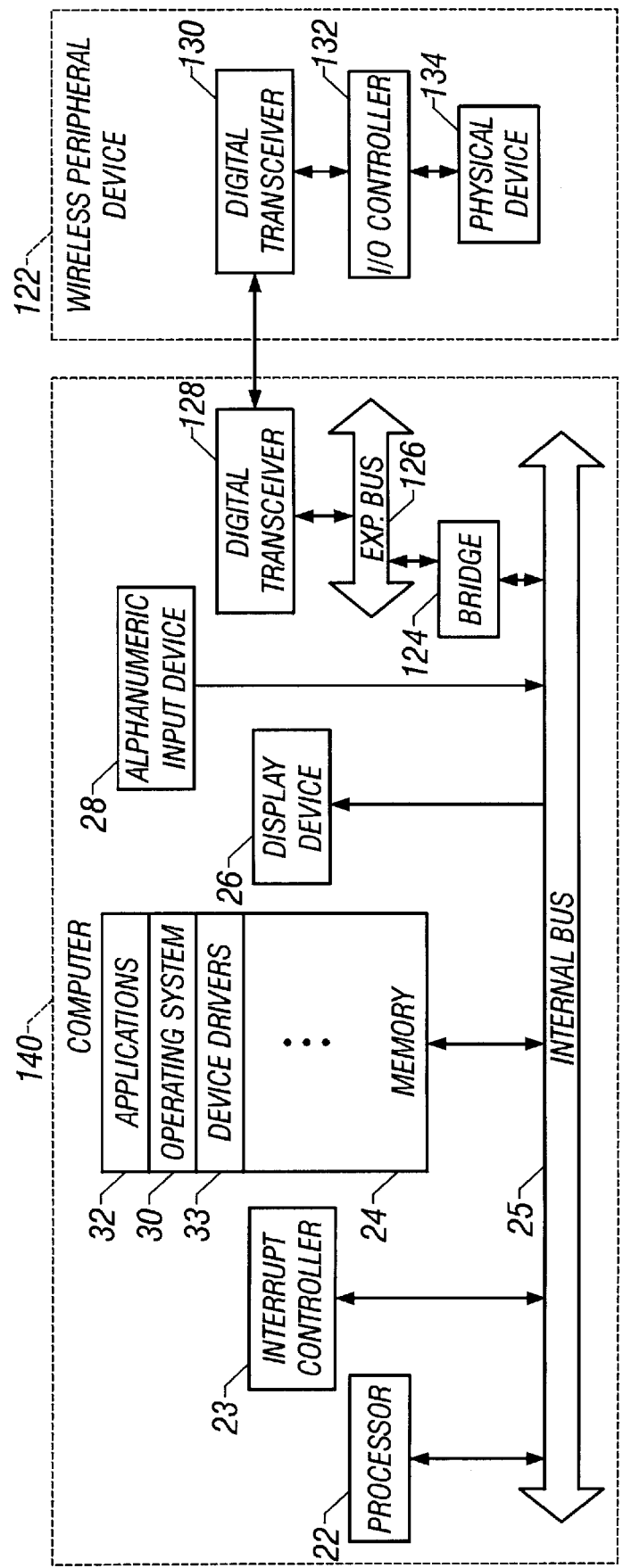
FIG. 6 is a schematic diagram of a second embodiment of a wireless bus extender communicating with a wireless peripheral device.

FIG. 6 is a schematic diagram of a second embodiment of a computer 140 having a wireless bus extender communicating with the wireless peripheral device 122. The computer 140 is substantially similar to the computer 120 of FIG. 5, except that the digital transceiver 128 is in communication with an expansion bus 126, such as a USB or PCI bus, in communication with the internal bus 25 through a bridge 124 rather than communicating directly with the internal bus 25. By communicating with the expansion bus 126, the digital transceiver 128 may take the form of an adapter card. Because the wireless bus extender can provide wireless communications using various communication protocols, such as USB, SCSI and PCI, it is possible to establish wireless communication with wireless peripheral devices that are designed to operate using these same communication protocols.

Figure 7:
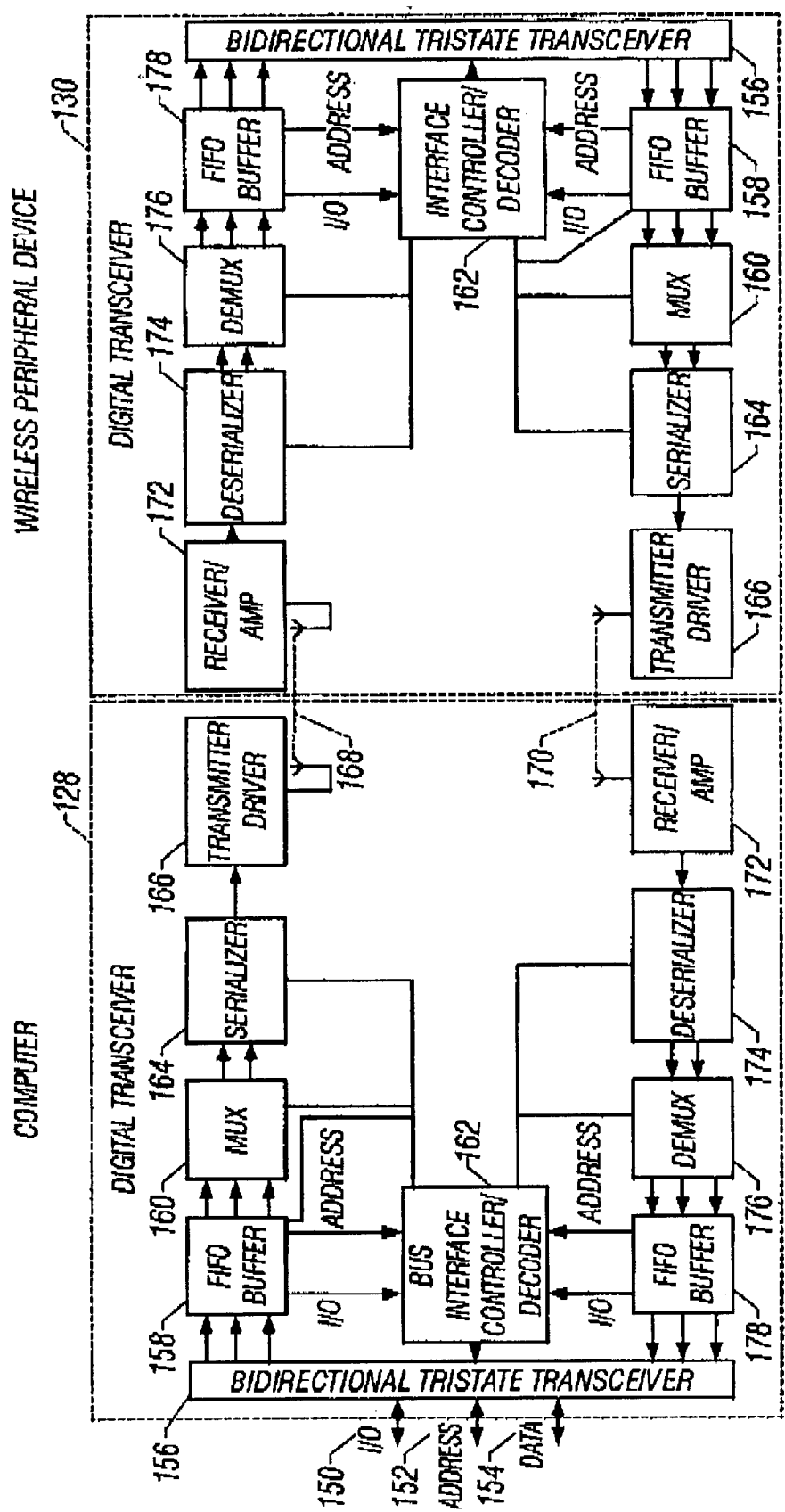
FIG. 7 is a schematic diagram of the digital transceivers in both a handheld computer and a wireless peripheral device.

FIG. 7 is a schematic diagram of the digital transceiver 128 from the computer and the digital transceiver 130 from the wireless peripheral device. The operation and use of the digital transceivers is described in U.S. Pat. No. 5,877,882, which patent is hereby incorporated by reference herein. It can be seen from the figure that the input/output 150, address locations 152 and data 154 are carried from the system bus to and from the transceiver 156. Information coming from the system bus passes through the transceiver 156 and then goes to the FIFO buffer 158. The FIFO buffer 158 transmits data 154 to the multiplexer 160. The FIFO buffer 158 transmits address 152 and input/output 150 to the bus interface controller/decoder 162. The bus interface controller/decoder directs information then to the multiplexer 160, to the serializer 164, or back to the FIFO buffer 158. The multiplexer 160 directs information to the serializer 164. The serializer 164 then sends information to the transmitter driver 166 which then goes out as a wireless transmission 168, such as radio frequency waves or infrared light.

Incoming wireless transmissions 170 enter a receiver amplifier 172 and are deserialized in the deserializer 174. The deserializer 174 then sends information to the demultiplexer 176. Information goes from the demultiplexer 176 to the FIFO buffer 178 for distribution either to the bus interface controller/decoder 162 or to the transceiver 156. The bus interface controller/decoder 162 sends information to the deserializer 174, the demultiplexer 176, or to the transceiver 156. The transceiver 156 then sends received information to the bus. It should be noted that while the system of FIG. 7 could be implemented as software, rather than hardware, the performance might be slower.

The architecture shown in FIG. 7 permits clock variation between the computer and the wireless peripheral device. Connection of devices made by different manufacturers is easily achievable since any device that conforms to the wireless link requirements can communicate with the computer. The digital transceiver also negates the need for multi-pin connectors that consume valuable space on the handheld computer. In accordance with the invention, the computer can provide full bus extension to all wireless peripheral devices.

It should be recognized that the digital transceivers 128, 130 operate in like fashion with the transmitter of one sending signals to the receiver of the other. Accordingly, the same reference numbers have been placed on the components of the digital transceiver 130 to indicate the identical function. It should also be recognized that the digital transceivers 128, 130 operate as described above, whether they are coupled directly to the internal bus 25 (as in FIG. 5) or coupled to an expansion bus 126 (as in FIG. 6).

FIG. 8 is a flow diagram illustrating the flow of data between the handheld computer 120 and the wireless peripheral device 122 over both a serial communication channel 180 and a parallel communication channel 182, shown here as an 8-bit channel. A parallel communication channel maybe implemented using 8 transceivers (not including the transceiver dedicated to a discovery channel) that are set to transmit and receive signals at 8 different frequencies. As mentioned above, the parallel communications must be transmitted simultaneously at the same time as dictated by clock pulses, illustrated by lines 183. It should be recognized that any number of frequencies may use to establish any number of channels, specifically including 16, 32, and 64.

Figure 9A:
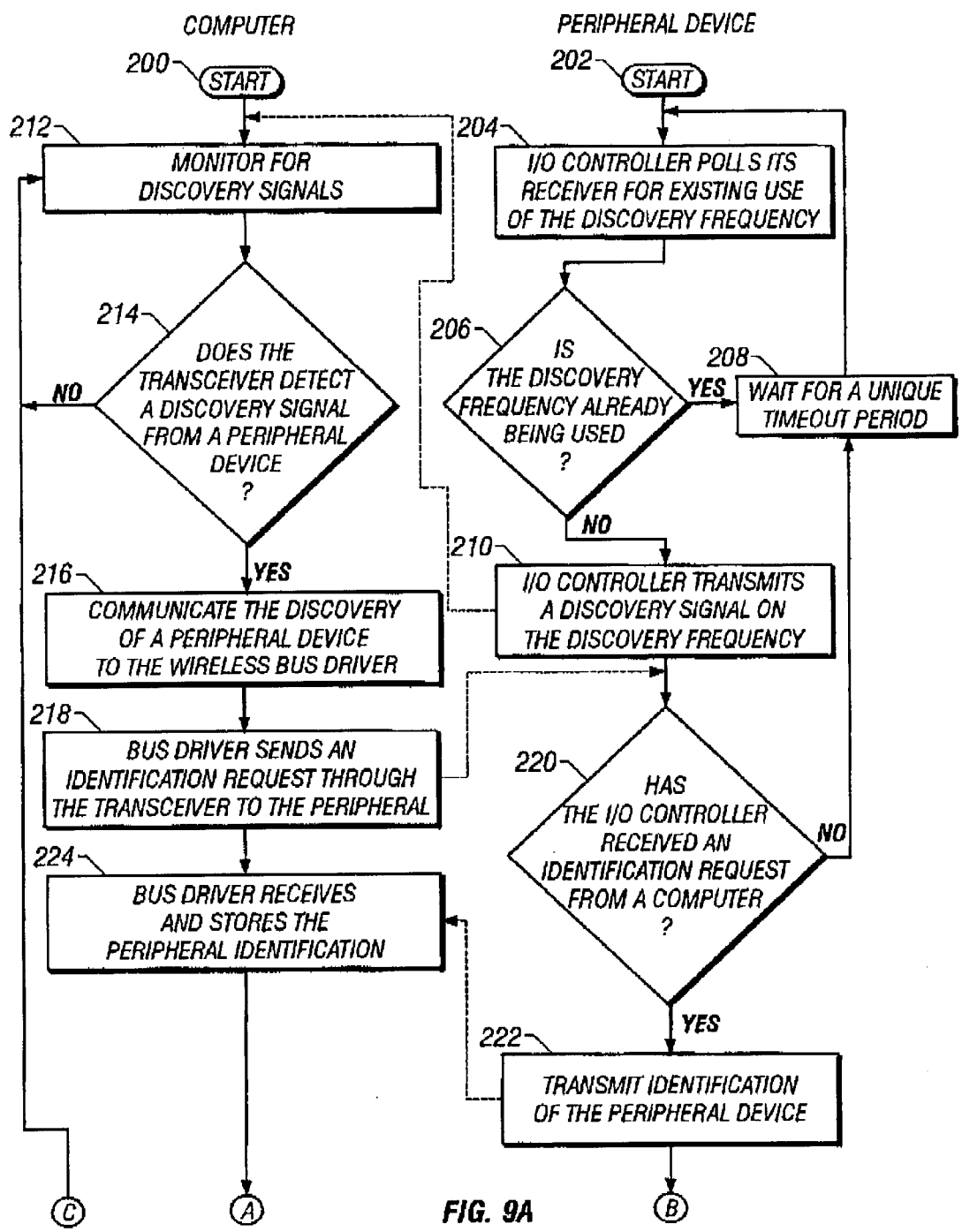
FIGS. 9A–B provide a flowchart for a device discovery process in accordance with the invention.
Figure 9B:
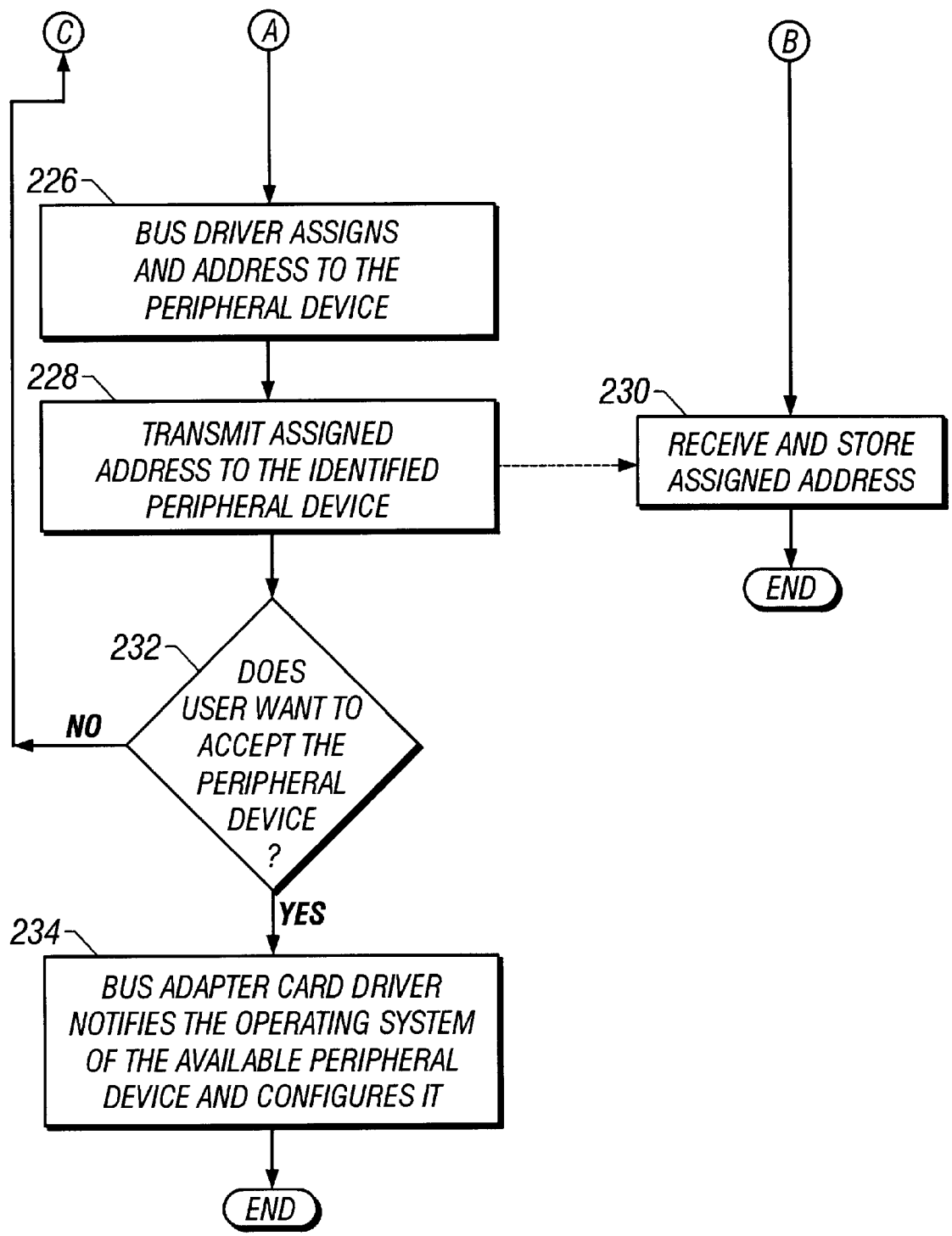

FIGS. 9A and 9B provide a flowchart for a discovery process that is carried out between a computer and a peripheral device, such as in FIGS. 5–8, in accordance with the invention. A computer equipped with a wireless bus extender and a wireless peripheral device are both turned on in steps 200 and 202. In state 204, the I/O controller polls its receiver for existing use of the discovery frequency and, in state 206, the I/O controller determines whether the discovery frequency is already being used. If the discovery frequency is currently being used, then in state 208 the I/O controller waits for a unique timeout period before polling the discovery frequency again. The timeout period is preferably unique and assigned to each peripheral device in a manner that will maximize the availability of the discovery frequency by preventing the peripheral from repeatedly polling at the exact same time and interval as another peripheral is transmitting its discovery signal at the same frequency. As in state 210, each peripheral device will transmit a discovery signal on the same discovery frequency in order to allow detection of the peripheral by a computer in range of the transmission. Alternatively, it is possible to establish different frequencies that are to be used with different devices, such that detecting a peripheral transmitting at a given frequency will indicate to the computer what type of peripheral device is there. Further still, it is possible to establish a system in which the computer transmits a request signal to the peripherals, but the preferred method is as set out in states 204–210 since this conserves use of the computer's processor and power for other tasks.

In state 212, the computer monitors its discovery frequency transceiver for discovery signals from peripherals within range. If no discovery signal is detected in state 214, then the process returns to state 212 for further monitoring If the transceiver detects a discovery signal from a peripheral device in state 214, then the discovery of a peripheral device is communicated to the wireless bus driver in state 216. In state 218, the wireless bus driver sends an identification request through the transceiver to the peripheral device that was detected.

Returning to the peripheral device, the I/O controller determines, in state 220, if an identification request has been received from a computer, f no identification request has been received in state 220, then the peripheral device returns to state 208. If an identification request has in fact been received in state 220, then the identification of the peripheral device is transmitted from the peripheral's transceiver in state 222.

In the computer, the bus driver receives and stores the peripheral device identification in state 224. Continuing on to FIG. 9B, in state 226, the bus driver assigns an address to the peripheral device and, in state 228, this address is transmitted to the identified peripheral device. In state 230, the peripheral receives and stores the assigned address. The bus driver, preferably in cooperation with the operating system, will query whether the user has chosen to accept the peripheral device during state 232. If the user rejects the peripheral device in state 232, then control is passed back to state 212 to monitor for further discovery signals. If, in state 232, the user accepts the peripheral device, then in state 234 the bus driver notifies the operating system of the available peripheral device and the peripheral device is configured. This concludes what may be considered to be the discovery process, since both the computer and the peripheral device know that the other exists and how to communicate with the other. The process may then sit dormant until further communication is initiated by the computer or until the communication is terminated.

Figure 10A:
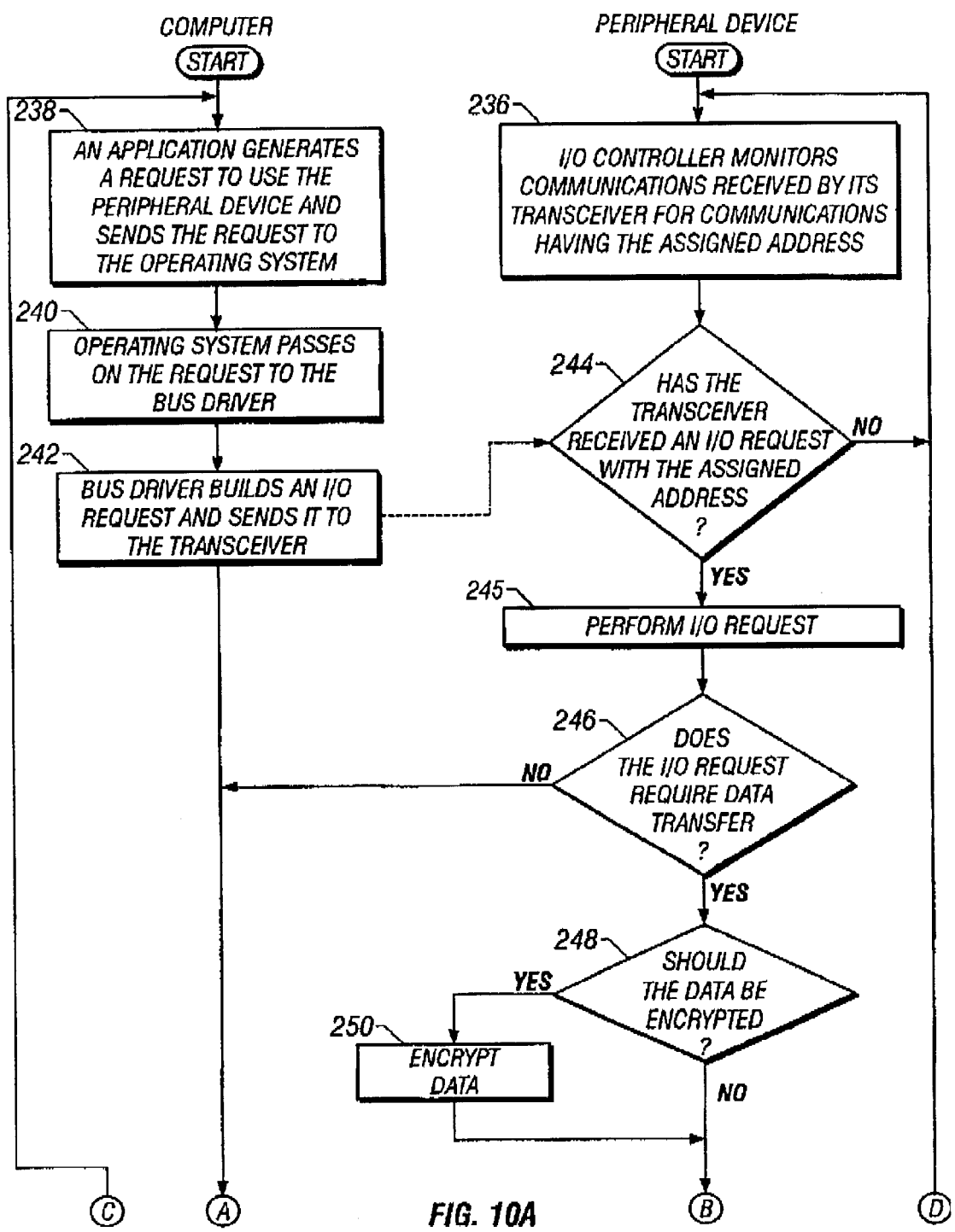
FIGS. 10A–B provide a flowchart for a device communication process in accordance with the invention.
Figure 10B:
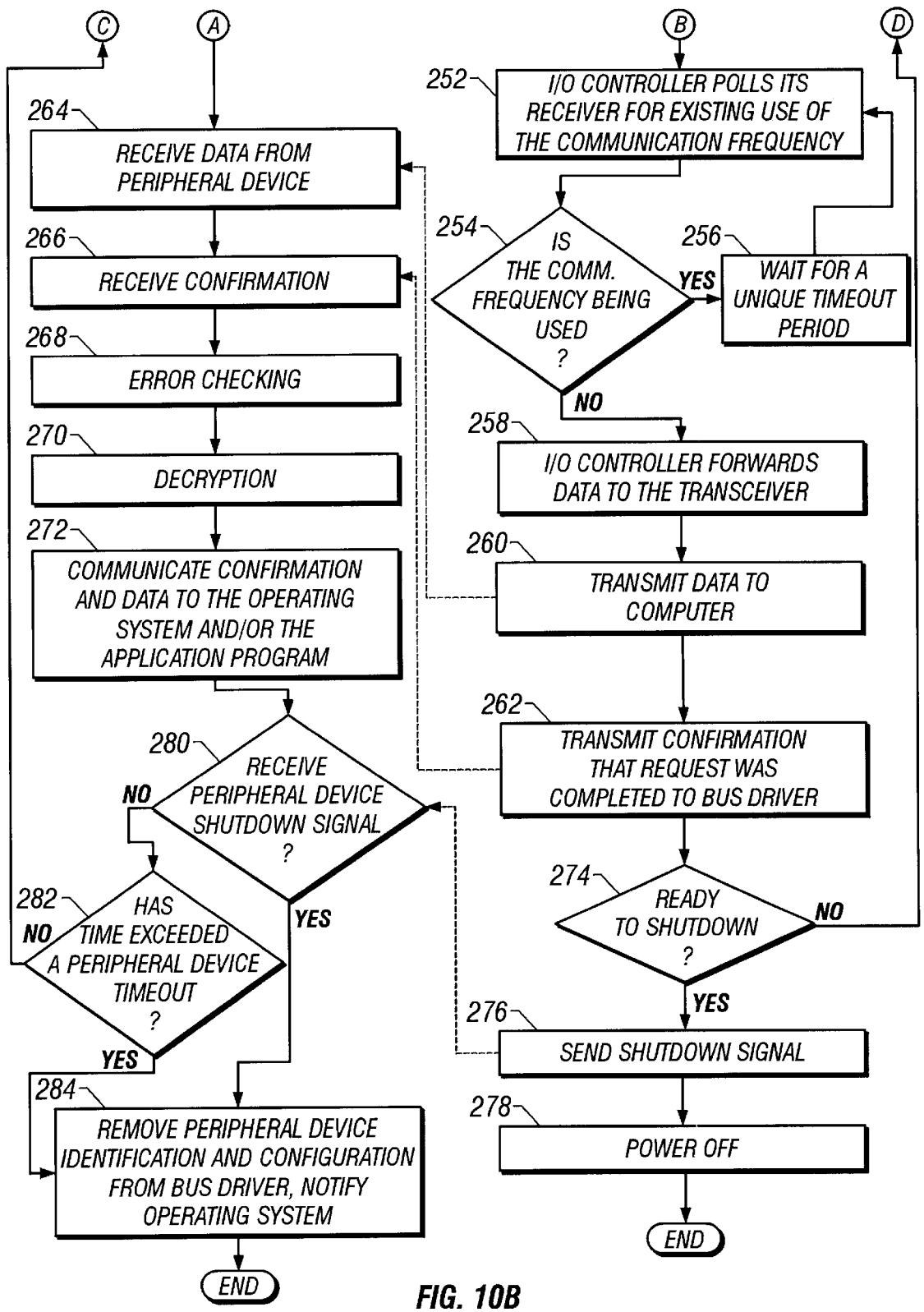

FIGS. 10A–B provide a flowchart for a device communication process in accordance with the invention. In state 236, the I/O controller of the peripheral device monitors communications received by its transceiver for communications having the assigned address. In state 238, an application program being executed by the computer generates a request to use the peripheral device and sends the request to the operating system. In turn, according to state 240, the operating system passes on the request to the bus driver. The bus driver then builds an I/O request and sends it to the transceiver for transmitting to the peripheral in state 242.

In state 244, the peripheral device determines whether the transceiver has received an I/O request with the assigned address. If no I/O request with the assigned address has been received, then the I/O controller continues to monitor communications in accordance with state 236. If an I/O request has been received with the assigned address, then in state 245, the peripheral device performs or executes the I/O request. Then, in state 246, it is determined whether the I/O request requires data transfer. If data transfer is required, then, in state 248, it is determined whether the data should be encrypted. If encryption is to be used, then the data is encrypted in state 250. It should be recognized that states 246–250 are only necessary for peripheral devices of a type that are capable of providing data to the computer, such as hard disks or CD ROMs, or when communications with the device need to be secure.

In state 252, the I/O controller polls its receiver for existing use of the communication frequency and, in state 254, the I/O controller determines whether the communication frequency is already being used. If the communication frequency is currently being used, then in state 256 the I/O controller waits for a unique timeout period before polling the communication frequency again. The timeout period is preferably unique and assigned to each peripheral device in a manner that will maximize the availability of the communication frequency by preventing the peripheral from repeatedly polling at the exact same time and interval as another peripheral is transmitting its communication signal at the same frequency. If the communication frequency is not being used, then the I/O controller forwards data to the transceiver in state 258 and the data is transmitted to the computer in state 260. Then, upon completing the data transmission, state 262 provides for transmitting a confirmation of this fact through the transceiver to the bus driver.

In states 264 and 266, the wireless bus receives the data and the confirmation, respectively, from the peripheral device. Then, in states 268 and 270, steps are taken to check for errors in the data and decrypt the data, respectively. In state 272, the bus driver communicates confirmation and data to the operating system and/or the application program. While this essentially completes the communication process, the peripheral will generally remain available to the computer until the next time that an application generates a request to use the peripheral in accordance with state 238.

However, the peripheral device preferably executes a state 274, in which it is determined whether the peripheral device is ready to shutdown. If the peripheral is not to be shutdown, then control is passed back to state 236 where the peripheral device wait for further communications from the computer. If the peripheral device is being shutdown, then state 276 sends out a shutdown signal before powering off in state 278.

In state 280, the computer determined whether it has received a shutdown signal from the peripheral device. If no peripheral device shutdown has been received, then state 282 determines whether the time period since the last signal received from the peripheral device has exceeded a predetermined peripheral device timeout period? If not, then control is passed back to state 238 where the process waits for an application program to generate further requests to use the peripheral device. However, if the computer either receives a shutdown signal, as determined in state 280, or the predetermined peripheral device timeout period has been exceeded, as determined in state 282, then state 284 removes the peripheral device identification and configuration from the bus driver and notifies the operating system accordingly. After terminating the communication between the computer and peripheral device, any further communications between the two entities requires going through the device discovery process of FIGS. 9A and 9B.

An alternative method for determining whether to remove the peripheral device identification and configuration from the bus driver, requires that the peripheral device transmit a continuous signal at a unique, device-specific frequency in order to make its presence continuously detectable by the computer. Accordingly, if the computer cannot detect the unique frequency at any given time, then peripheral device identification and configuration are removed from the bus driver.

It is an important feature of the invention that the peripheral identification and addressing process allows for the discovery, addressing and utilization of multiple peripheral devices. Accordingly, the user can accept a wireless printer, a wireless display device, and a wireless keyboard, and have them each configured and available simultaneously. If the transceivers are all communicating at the same frequency, however, then the computer can communicate with only one device at a time. Even so, by repeatedly switching the transmission between the data and address of one peripheral to the data and address of one or more other peripherals, it is possible to achieve communications that appear to be simultaneous.

In order to achieve true multi-channel communications with multiple peripherals, each of the transceivers, such as the 8 transceivers facilitating the 8-bit communication of FIG. 8B, must transmit at a different frequency. Upon discovery of a peripheral device, the peripheral device is assigned to a particular transmission frequency rather than being assigned an address. In this manner, any transmission at the assigned frequency is essentially a direct communication with the peripheral.

It is an optional feature of the present invention to allow the user to set up certain preferences about how the bus driver will operate. It is anticipated that the user may desire to establish a preference that would always automatically accept peripheral devices, as in state 232 of FIG. 9B, as soon as its discovery signal is received by the transceiver. Another advantageous preference would be to limit the types of peripherals that the user wants to accept. For example, the user may prefer to automatically accept printers and disk drives, but not scanners or keyboards. Other and further preferences are within the scope of the present invention.

Figure 11:
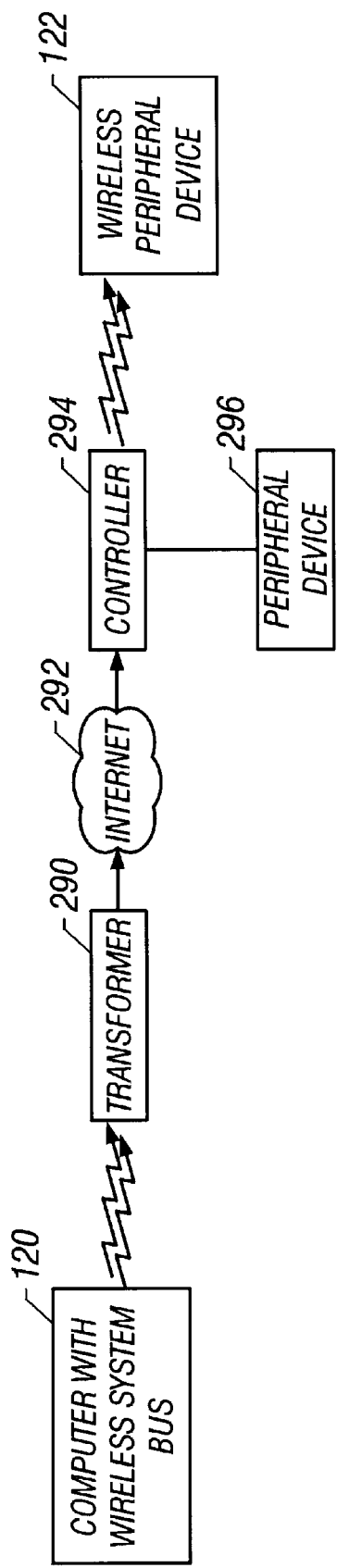
FIG. 11 is a block diagram of an alternative indirect means for connecting with a peripheral device.

Finally, FIG. 11 is a block diagram of an alternative indirect means for connecting with a peripheral device. In a manner consistent with the foregoing description, the computer 120 establishes wireless communication with a transformer 290 that is maintained in the proximity of the computer 120 so as to transmit and receive wireless transmissions therewith. The transformer 290 is capable of outside communication with other devices, including communications over a network 292, such as the Internet or local area network. The transformer 290 directs communications over the network 292 to a controller 294 that provides communication with either an attached peripheral device 296 or a wireless peripheral device 122. In this manner, the computer 120 is not limited to the use of peripherals within the computer's immediate broadcast range, but may use any peripheral that may be established into communication with the transformer 290. Only the transformer is required to be in the proximity of the computer 120. It should be recognized that the communications between the transformer 290, network 292, controller 294 and peripheral device 122 maybe established by any means, including but not limited to wireless connections, wired connections, and combinations thereof. To establish communications with the peripheral device 122, the network IP address of the peripheral 122 must be provided to the transformer 290 and the network IP address of the transformer 290 must be provided to the peripheral device 122 so that communications can be directed between the two devices. Preferably, the communication between the computer and the transformer will proceed according to the earlier description.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for establishing a wireless communication link between a first transceiver communicatively coupled to a computer bus and a second transceiver communicatively coupled to a peripheral device, wherein the computer is configured to operate under the control of an operating system and one or more application program, the method comprising:

polling for a discovery signal from die peripheral device at one or more polling frequencies;

receiving at the first transceiver a device discovery signal from the peripheral device at a particular frequency, wherein the particular frequency is one of the one or more polling frequencies;

identifying the particular frequency, wherein the particular frequency identifies the peripheral device by type and is not a network frequency;

providing identification of the peripheral device to a bus driver through the first transceiver, wherein the bus driver is stored in a memory device that is coupled to the bus; and communicating information from the application program over the wireless communication link to the peripheral device.

2. The method of claim 1, further comprising:

transmitting the device discovery signal at the particular frequency from the transceiver of the peripheral device.

3. The method of claim 2, further comprising:

determining if the particular frequency is in use before transmitting the device discovery signal.

4. The method of claim 3, wherein the step of determining if the particular frequency is in use further comprises:

polling the receiver of the peripheral device at the particular frequency.

5. The method of claim 3, further comprising:

if the particular frequency is in use, waiting for a timeout period before polling again.

6. The method of claim 1, wherein the step of communicating information from the application program over the wireless communication link to the peripheral device includes communicating information through the operating system, the device driver, the first transceiver, and the second transceiver.

7. The method of claim 2, further comprising:

communicating the device discovery from the first transceiver over the bus to the bus driver.

8. The method of claim 1, further comprising:

automatically configuring the bus driver for communication with the peripheral device.

9. The method of claim 1, further comprising:

assigning an address to the peripheral device; and communicating the assigned address between the computer and the peripheral device.

10. The method of claim 1, wherein the information that is communicated is selected from commands, data, and combinations thereof.

11. The method of claim 1, further comprising:

encrypting the information before transmitting the information; and transmitting the encrypting information.

12. The method of claim 1, further comprising:
informing a user of the computer of the identification of the peripheral device; and
querying the user whether to accept the peripheral device.

13. The method of claim 9, further comprising:
monitoring the second transceiver at a communication frequency for wireless communications containing the assigned address; and
receiving a communication containing the assigned address, wherein the communication is a request from an application program to use the peripheral device.

14. The method of claim 13, further comprising:
determining if the communication frequency is in use before transmitting a reply communication.

15. The method of claim 14, wherein the step of determining if the device communication frequency is in use further comprises:
polling the receiver of the peripheral device at the communication frequency.

16. The method of claim 14, further comprising:
if the communication frequency is in use, waiting for a timeout period before polling again.

17. The method of claim 13, further comprising:
transmitting data from the one or more peripheral devices to the computer in reply to the request.

18. The method of claim 11, further comprising:
decrypting the encrypted information transmitted between the peripheral device and the computer.

19. The method of claim 1, further comprising:
transmitting a shutdown signal from the transceiver of the peripheral device before shutting down the peripheral device.

20. The method of claim 19, further comprising:
removing the identification of the peripheral device from the driver upon receiving a shutdown signal from the peripheral device.

21. The method of claim 1, further comprising:
continuously transmitting a signal at a unique frequency from the transceiver of the peripheral device; and
removing the identification of the peripheral device from the driver if the computer can no longer detect a signal from the peripheral device.

22. The method of claim 19, further comprising:
removing the identification of the peripheral device from the driver if no reply is received from the peripheral device within a predetermined peripheral device timeout period.

23. A method for establishing a wireless communication link between a wireless bus extender communicatively coupled to a computer bus and a first transceiver communicatively coupled to a peripheral device that is communicably coupled to a second transceiver, wherein the computer is configured to operate under the control of an operating system and one or more application program, the method comprising:
polling for a discovery signal from the peripheral device at one or more polling frequencies;
receiving at the first transceiver a device discovery signal from the peripheral device at a particular frequency, wherein the particular frequency is one of the one or more polling frequencies;
identifying the particular frequency, wherein the particular frequency identifies the peripheral device by type and is not a network frequency;
providing identification of the peripheral device to a bus driver for the wireless bus extender, wherein the bus driver is stored in a memory device that is coupled to the bus; and
communicating commands information from the application program over the wireless communication link to the peripheral device.

24. The method of claim 23 wherein the wireless bus extender comprises a transceiver for transmitting and receiving wireless signals selected from radio frequency and infrared.

25. The method of claim 9, wherein the address is an assigned frequency, the method further comprises:
monitoring the second transceiver at the assigned frequency for wireless communications; and
receiving a communication, wherein the communication is a request from an application program to use the peripheral device.

26. A computer program product including instructions embodied on a computer readable medium, for establishing a wireless communication link between a first transceiver communicatively coupled to a computer bus and a second transceiver communicatively coupled to a peripheral device, wherein the computer is configured to operate under the control of an operating system and one or more application programs the instructions comprising:
polling instructions for polling for a discovery signal from the peripheral device at one or more polling frequencies;
receiving instructions for receiving at the first transceiver a device discovery signal from the peripheral device at a particular frequency, wherein the particular frequency is one of the one or more polling frequencies;
identifying instructions for identifying the particular frequency, wherein the particular frequency identifies the peripheral device by type, and wherein the particular frequency is not a network frequency;
providing instructions for providing identification of the peripheral device to a bus driver through the first transceiver, wherein the bus driver is stored in a memory device that is coupled to the bus; and
communicating instructions for communicating information from the application program over the wireless communication link to the peripheral device.

27. The computer program product of claim 26, further comprising:
transmitting instructions for transmitting the device discovery signal from the peripheral device transceiver at the particular frequency.

28. The computer program product of claim 27, further comprising:
communicating instructions for communicating the device discovery from the first transceiver over the bus to the driver.

29. The computer program product of claim 27, further comprising:
determining instructions for determining if the particular frequency is in use before transmitting a device discovery signal.

30. The computer program product of claim 29, wherein the determining instructions for determining if the particular frequency is in use further comprises:
polling instructions for polling the peripheral device receiver at the particular frequency.

31. The computer program product of claim 29, further comprising:

waiting instructions for waiting for a timeout period before polling the peripheral device if the particular frequency is in use.

32. The computer program product of claim 26, wherein the instructions for communicating information from the application program over the wireless communication link to the peripheral device includes instructions for communicating information through the operating system, the device driver, the first transceiver, and the second transceiver.

33. The computer program product of claim 26, further comprising:
assigning instructions for assigning an address to the peripheral device; and
communicating instructions for communicating the assigned address between the computer and the peripheral device.

34. The computer program product of claim 33, further comprising:
monitoring instructions for monitoring the second transceiver for wireless communications containing the assigned address; and
receiving instructions for receiving a communication containing the assigned address, wherein the communication is a request from an application program to use the peripheral device.

35. The computer program product of claim 34, further comprising:
transmitting instructions for transmitting data from the peripheral device to the computer in reply to the request.

36. The computer program product of claim 34, further comprising:
determining instructions for determining if the communication frequency is in use before transmitting a reply communication.

37. The computer program product of claim 36, wherein the determining instructions for determining if the device communication frequency is in use further comprises:
polling instructions for polling the peripheral device receiver at the communication frequency.

38. The computer program product of claim 36, further comprising:
waiting instructions for waiting for a timeout period before polling the peripheral device if the communication frequency is in use.

39. The computer program product of claim 26, wherein the information that is communicated is selected from commands, data, and combinations thereof.

40. The computer program product of claim 26, further comprising:
encrypting instructions for encrypting the information before transmitting the information; and
transmitting instructions for transmitting the encrypted information.

41. The computer program product of claim 40, further comprising:
decrypting instructions for decrypting the encrypted information transmitted between the peripheral device and the computer.

42. The computer program product of claim 26, further comprising:
informing instructions for informing a user of the computer of the peripheral device identification; and querying instructions for querying the user whether to accept the identified peripheral device.

43. The computer program product of claim 26, further comprising:
transmitting instructions for transmitting a shutdown signal from the peripheral device transceiver before shutting down the peripheral device.

44. The computer program product of claim 43, further comprising:
removing instructions for removing the identification of the peripheral device from the driver upon receiving a shutdown signal from the peripheral device.

45. The computer program product of claim 43, further comprising:
removing instructions for removing the identification of the peripheral device from the driver if no reply is received from the peripheral device within a predetermined peripheral device timeout period.

46. The computer program product of claim 33, wherein the address is an assigned frequency, the computer program product further comprises:
monitoring instructions for monitoring the second transceiver at the assigned frequency for wireless communications; and
receiving instructions for receiving a communication, wherein the communication is a request from an application program to use the peripheral device.

47. A computer program product that provides instructions for establishing a wireless communication link between a wireless bus extender communicatively coupled to a computer bus and a first transceiver communicatively coupled to a peripheral device that is communicably coupled to a second transceiver, wherein the computer is configured to operate under the control of an operating system and one or more application programs, the computer program product comprising;
polling instructions for polling a discovery signal from the peripheral device at various polling frequencies;
receiving instructions for receiving at the first transceiver a device discovery signal from the peripheral device at a particular frequency, wherein the particular frequency is one of the one or more polling frequencies;
identifying instructions for identifying the particular frequency, wherein the particular frequency identifies the peripheral device by type and is not a network frequency;
identification instructions for providing identification of the peripheral device to a bus driver for the wireless bus extender, wherein the bus driver is stored in a memory device that is coupled to the bus; and
communicating instructions for communicating information from the application program over the wireless communication link to the peripheral device.

48. The computer program product of claim 47, wherein the wireless bus extender comprises a transceiver for transmitting and receiving wireless signals selected from radio frequency and infrared.

49. The method of claim 23, further comprising;
assigning an address to the peripheral device; and
communicating the assigned address between the computer and the peripheral device.

50. The method of claim 49, wherein the address is an assigned frequency, the method further comprises:
  monitoring the second transceiver at the assigned frequency for wireless communications; and
  receiving a communication, wherein the communication is a request from an application program to use the peripheral device.

51. The computer program product of claim 26, further comprising:
  configuring instructions for automatically configuring the bus driver for communication with the peripheral device.

* * * * *